United States Patent
Lowenberg et al.

(10) Patent No.: US 11,270,026 B2
(45) Date of Patent: Mar. 8, 2022

(54) METHOD AND SYSTEM FOR SECURING PERSONALLY IDENTIFIABLE INFORMATION

(71) Applicant: MASTERCARD INTERNATIONAL INCORPORATED, Purchase, NY (US)

(72) Inventors: Todd Christian Lowenberg, Redding, CT (US); Andrew S. Reiskind, Armonk, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 162 days.

(21) Appl. No.: 16/585,316

(22) Filed: Sep. 27, 2019

(65) Prior Publication Data

US 2021/0097200 A1 Apr. 1, 2021

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC ............................ G06F 21/6254; G06F 21/602
See application file for complete search history.

(56) References Cited

U.S. PATENT DOCUMENTS

2012/0303616 A1  11/2012  Abuelsaad et al.
2013/0018781 A1*  1/2013  Prada Peyser ......... G06Q 20/20
                                                              705/39
2016/0005041 A1*  1/2016  Reiskind ............... G06Q 40/02
                                                              705/64

(Continued)

FOREIGN PATENT DOCUMENTS

WO  2014/075836 A1  5/2014
WO  2017/161403 A1  9/2017

OTHER PUBLICATIONS

Notification of Transmittal of the International Search Report (Forms PCT/ISA/220 and PCT/ISA/210) and the Written Opinion of the International Searching Authority (Form PCT/ISA/237) dated Oct. 22, 2020, by the Federal Institute of Industrial Property in corresponding International Application No. PCT/US2020/046298. (7 pages).

*Primary Examiner* — Joseph P Hirl
*Assistant Examiner* — Stephen T Gundry
(74) *Attorney, Agent, or Firm* — Buchanan Ingersoll & Rooney PC

(57) ABSTRACT

A method for linking de-identified data identifiers to traceable data identifiers in compliance with applicable data privacy rules and regulations includes: receiving a plurality of first data identifiers from a first computing system; applying a one-way hashing algorithm and salt to the first data identifiers to generate second data identifiers; storing an association between each of the first data identifiers and the respective second data identifier; receiving one or more specific second data identifiers from a second computing system; identifying, for each of the one or more specific second data identifiers, the associated first data identifier; and transmitting each identified associated first data identifier to the first computing system.

14 Claims, 5 Drawing Sheets

(56) References Cited

U.S. PATENT DOCUMENTS

| | | | |
|---|---|---|---|
| 2016/0147945 A1* | 5/2016 | MacCarthy | G06F 21/6254 |
| | | | 705/51 |
| 2017/0048708 A1* | 2/2017 | Ulrich | H04L 63/0876 |
| 2018/0082082 A1* | 3/2018 | Lowenberg | G06Q 20/10 |
| 2018/0096381 A1* | 4/2018 | Lowenberg | G06Q 30/0246 |
| 2018/0101851 A1* | 4/2018 | Lowenberg | G06Q 20/4016 |
| 2019/0109706 A1* | 4/2019 | Peterson | G06F 21/6209 |
| 2019/0332802 A1* | 10/2019 | Barday | G06F 21/6245 |
| 2020/0272764 A1* | 8/2020 | Brannon | G06F 21/6218 |
| 2021/0004488 A1* | 1/2021 | Lapushkin | G06F 21/6254 |
| 2021/0049295 A1* | 2/2021 | Tang | H04L 9/0894 |

\* cited by examiner

METHOD AND SYSTEM FOR SECURING PERSONALLY IDENTIFIABLE INFORMATION

FIELD

The present disclosure relates to the securing of personally identifiable information, specifically the use of predetermined salts and one-way hashing algorithms for de-identifying data and the ability to link de-identified identifiers back to personally identifiable information with individual consent.

BACKGROUND

Personally identifiable information can be a value data source for many researchers, heath care providers, security professionals, and other entities. However, in many instances there are often rules and regulations prohibiting the use of personally identifiable information. In many cases, individuals are not in a position to provide the consent necessary for the use of their personally identifiable information. However, there are often times where the underlying data, without the personally identifiable aspects of the information, can have significant value to an entity. For these cases, de-identification has significant value to enable research. De-identification can be done using one-way hashing, bucketing, aggregation, and other techniques that will remove or obscure the personally identifiable information without adversely affecting the additional, non-identifiable data. Entities are then free to use this data while limiting negative impacts to individual privacy.

However, there are times where it may be societally and individually beneficial to identify the individual that is associated with de-identified data. For example, medical trials and other health-related ventures often use anonymized and de-identified data. During the course of using the anonymized data, an entity may discover a significant health concern for an anonymous individual. Because de-identification identification and anonymization are typically one-way to protect individual privacy (e.g., so the entity conducting the research cannot re-identify the individual), the entity may have no way to contact the anonymous individual to let them know of the health concern. Currently, there are no methods where, under circumstances consented to by an individual, the individual can be re-linked to their de-anonymized data in a manner that prevents the entity conducting the research from any unauthorized re-linkage. Thus, there is a need for such a system.

SUMMARY

The present disclosure provides a description of systems and methods for linking de-identified data identifiers to traceable data. Data that involves personally identifiable information (PII) is re-identified before being shared with a third party entity that wants to use the data. As part of the de-identification, de-identified identifiers are used to keep track of the data without being personally identifiable back to the original individuals. The third party entity performs further de-identification, discarding all identifiers from earlier rounds. For re-linkage, an external computing system, such as operated by an additional entity, is used. This external computing system receives the initial de-identified identifiers, but no other additional data. Salts or other data used in performing further de-identification by the third party entity are shared with the computer system, which retains each round of identifiers. When there is a need for re-linkage of a de-identified identifier, with an appropriate legal basis for that re-identification (e.g., individual permission may be given before the process, such as by an individual entering into a medical trial consenting to re-identification if a significant health concern is revealed), that specific de-identified identifier is provided to the external computer system. This system, which does not have any data beyond the identifiers, links the de-identified identifier back to the original de-identified identifier, which is then provided to the originator of the data. The originator can then contact the individual. As a result, PII can be re-linked, but only by the authorized originator as the third party entity will never be in possession of any data enabling a re-linkage, and the external computer system is never in possession of any PII.

A method for linking de-identified data identifiers to traceable data identifiers in compliance with applicable data privacy rules and regulations includes: receiving, by a receiver of a processing server, a plurality of first data identifiers from a first computing system; applying, by a processing device of the processing server, a one-way hashing algorithm with a first salt to the plurality of first data identifiers to generate a plurality of second data identifiers; storing, in a memory of the processing server, an association between each of the first data identifiers and the second data identifier generated from the respective first data identifier; receiving, by the receiver of the processing server, one or more specific second data identifiers from a second computing system; executing, by the processing device of the processing server, a query on the memory to identify, for each of the one or more specific second data identifiers, the associated first data identifier; and transmitting, by a transmitter of the processing server, each identified associated first data identifier to the first computing system.

Another method for linking de-identified data identifiers to traceable data identifiers in compliance with applicable data privacy rules and regulations includes: receiving, by a receiver of a processing server, a plurality of first data identifiers from a first computing system and, for each of the first data identifiers, one or more personally identifiable data values; applying, by a processing device of the processing server, a one-way hashing algorithm with a first salt to the plurality of first data identifiers to generate a plurality of second data identifiers; storing, in a memory of the processing server, an association between each of the first data identifiers and the second data identifier generated from the respective first data identifier; receiving, by the receiver of the processing server, one or more specific second data identifiers from a second computing system; executing, by the processing device of the processing server, a query on the memory to identify, for each of the one or more specific second data identifiers, the associated first data identifier; generating, by the processing device of the processing server, a data message for each of the one or more specific second data identifiers based on at least the one or more personally identifiable data values received with the identified associated first data identifier; and transmitting, by a transmitter of the processing server, each generated data message.

A system for linking de-identified data identifiers to traceable data identifiers in compliance with applicable data privacy rules and regulations includes: a transmitter of a processing server; a receiver of the processing server configured to receive a plurality of first data identifiers from a first computing system; a processing device of the processing server configured to apply a one-way hashing algorithm with a first salt to the plurality of first data identifiers to generate a plurality of second data identifiers; and a memory of the processing server configured to store an association between each of the first data identifiers and the second data identifier generated from the respective first data identifier, wherein the receiver of the processing server is further configured to receive one or more specific second data identifiers from a second computing system; the processing device of the processing server is further configured to execute a query on the memory to identify, for each of the one or more specific second data identifiers, the associated first data identifier, and the transmitter of the processing server is configured to transmit each identified associated first data identifier to the first computing system.

Another system for linking de-identified data identifiers to traceable data identifiers in compliance with applicable data privacy rules and regulations includes: a transmitter of a processing server; a receiver of the processing server configured to receive a plurality of first data identifiers from a first computing system and, for each of the first data identifiers, one or more personally identifiable data values; a processing device of the processing server configured to apply a one-way hashing algorithm with a first salt to the plurality of first data identifiers to generate a plurality of second data identifiers; and a memory of the processing server configured to store an association between each of the first data identifiers and the second data identifier generated from the respective first data identifier, wherein the receiver of the processing server is further configured to receive one or more specific second data identifiers from a second computing system, the processing device of the processing server is further configured to execute a query on the memory to identify, for each of the one or more specific second data identifiers, the associated first data identifier, and generate a data message for each of the one or more specific second data identifiers based on at least the one or more personally identifiable data values received with the identified associated first data identifier, and the transmitter of the processing server is configured to transmit each generated data message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems where the processing server 102 may not possess any personally identifiable information without legal basis to do so (e.g., consent, court order, etc.). Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the processing server 102 may not possess the PII or be able to decrypt the encrypted PII unless there is a legal basis to do so.

System for Linking De-Identified Data Identifiers to Traceable Data

Figure 1:
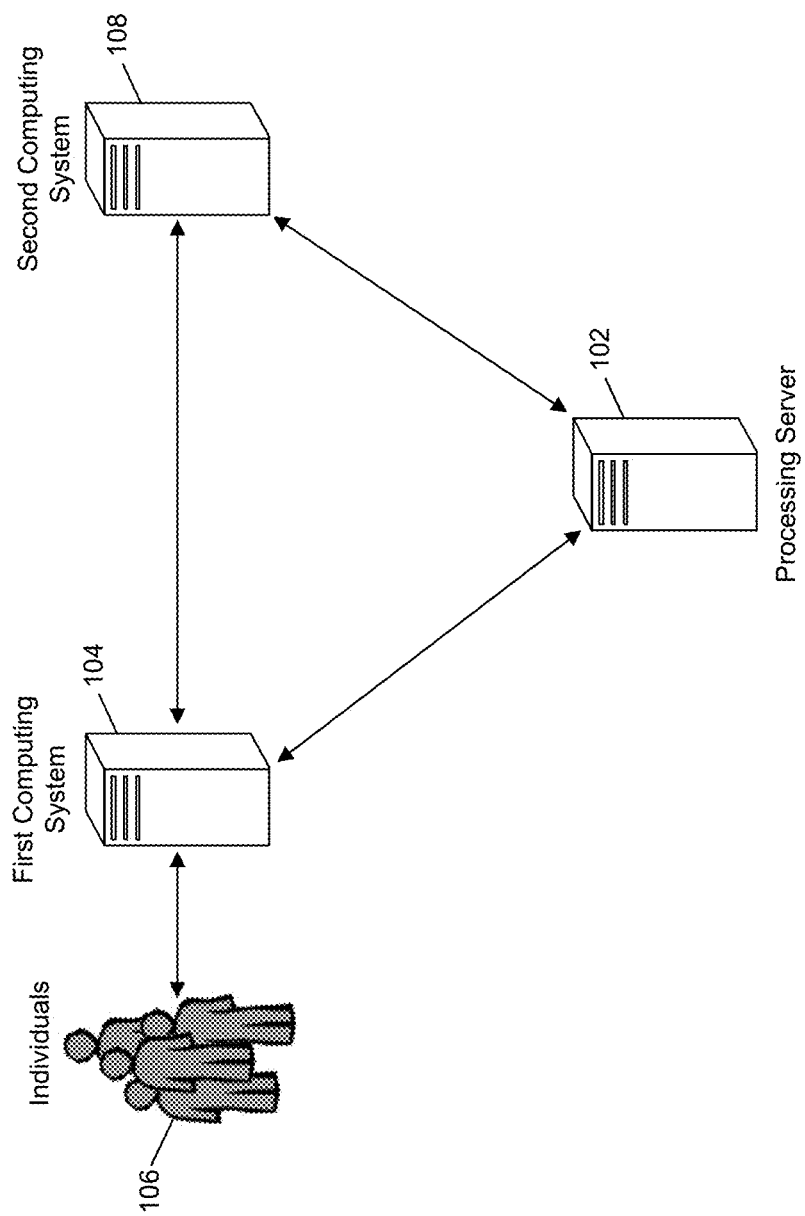
FIG. 1 is a block diagram illustrating a high level system architecture for linking de-identified data identifiers to traceable data in accordance with exemplary embodiments.

FIG. 1 illustrates a system 100 for the linking of data identifiers that have been de-identified to traceable data that can provide a re-linkage to personally identifiable information (PII) with consent of the associated individual.

The system 100 may include a processing server 102. The processing server 102, discussed in more detail below, may be configured to link de-identified identifiers to traceable data, where, as a result of the linkage, the de-identified identifiers can be linked back to PII under conditions where consent has been provided. In the system 100, a first computing system 104 may collect personally identifiable information from a plurality of individuals 106. The first computing system 104 may be part of an entity that collects PII from individuals 106 for any suitable reason. For example, the first computing system 104 may be part of a merchant or retailer that collects purchasing data from its customers, the first computing system 104 may be part of a health care provider that collects medical data regarding its patients, the first computing system 104 may be part of a credit bureau that collects demographic and other data from individuals 106, etc. In the system 100, each of the individuals 106 may consent to the collection of PII by the first computing system 104 or an entity associated therewith.

In the system 100, a second computing system 108 may be interested in the data being collected on the individuals 106. The second computing system 108 may be part of an entity that is separate from the entity associated with the first computing system 104, and may not be authorized by any of the individuals 106 to collect or possess any PII. As a result, the second computing system 108 may be interested in, and authorized to obtain, data regarding the individuals 106 that has been de-identified such that it cannot be traced to any PII of the individuals 106. To provide the second computing system 108 with data that complies with these requirements, the first computing system 104 may de-identify the PII data that is has collected for the individuals 106. As used herein, "de-identify" may be synonymous with "anonymization" as referring to any process used to remove or otherwise obscure PII in a manner that cannot be directly linked back to any PII, though under certain laws these may be distinct methodologies.

As part of the de-identified process, the first computing system 104 may anonymize at least a unique identifier that is associated with each individual 106 and their respective data. De-identification of the unique identifier may utilize one-way hashing or any other suitable mechanism that is irreversible such that an entity cannot generate the unique identifier from the resulting de-identified identifier. As discussed herein, the resulting de-identified identifier may be referred to as a "De-ID." The first computing system 104, as an authorized possessor of PII, may retain a correlation between the De-IDs and the original unique identifiers, such as in a lookup table or other suitable mechanism.

To provide the second computing system 108 with usable data that is not personally identifiable to the individuals 106, the first computing system 104 may transmit the individual data with all PII removed and the De-IDs included in place of any unique identifiers. The second computing system 108 may thus receive the de-identified data with the accompanying De-IDs. For further protection and de-identification, upon receipt of the de-identified data and De-IDs, the second computing system 108 may perform at least one additional round of de-identification. The second computing system 108 may take the originally received De-IDs, each referred to herein as a De-ID$_1$, and apply a one-way hashing algorithm with a salt to generate, for each De-ID$_1$, a De-ID$_2$ that cannot be reversed and used to generate the De-ID$_1$. As used herein, "salt" may refer to any key, value, or mechanism used for a one-way hashing or other cryptographic mechanism that may be used to de-identify a unique identifier. Any suitable mechanism for generating the De-ID$_2$ may be used that is not reversible to obtain the De-ID$_1$ from the De-ID$_2$. Once the De-ID$_2$s have been generated, the second computing system 108 may discard the De-ID$_1$s, such that only the de-identified data and the accompanying De-ID$_2$s are possessed by the second computing system 108. In some embodiments, one or more additional rounds of de-identification may be performed by the second computing system 108, resulting in De-ID$_3$s or subsequent levels of de-identified identifiers.

The second computing system 108 may then be free to use the data in any suitable manner, which may be limited by the first computing system 104 as part of the agreement with providing the de-identified data to the second computing system 108. For instance, in one of the above examples, the first computing system 104 may collect medical information on individuals 106, which may be provided in de-identified form to the second computing system 108 for use in medical research. The second computing system 108 may then perform research using the underlying data that cannot be connected to any of the individuals 106 by the second computing system 108. In an exemplary embodiment, the second computing system 108 may identify a circumstance in which an individual 106 may need to be contacted. For instance, in the above example, the second computing system 108 may identify a significant health concern for an individual 106 as part of the research. To assist in the contacting of the individual, the processing server 102 may be used.

In some embodiments, the processing server 102 may be operated by or on behalf of an additional entity, which may be separate from the entities associated with the first computing system 104 and/or second computing system 108. For instance, in one example a first entity (e.g., a health care provider) may operate the first computing system 104, a second entity (e.g., a pharmaceutical research company) may operate the second computing system 108, and a third entity (e.g., a data service) may operate the processing server 102. In such an example, there may be no commonality in ownership or operation of any of the systems/devices operating in the system 100. In some cases, the ownership and/or control of the systems/devices in the system 100 may be subject to applicable laws or regulations, such as may be in effect in a jurisdiction where one or more of the systems/devices and/or individuals 106 is located. For instance, in one jurisdiction a single entity may be allowed to operate both the first computing system 104 and the processing server 102, but in another jurisdiction both systems may be required to be owned and operated by separate entities.

In the system 100, the first computing system 104 may provide all of the De-ID$_1$s to the processing server 102. In one embodiment, no PII or any other data, including de-identified data, may be provided to the processing server 102. In another embodiments, the first computing system 104 may provide PII to the processing server 102 with consent of the associated individuals 106. In such embodiments, the processing server 102 may perform functions of the first computing system 104 discussed herein, such as for contacting an individual 106.

The processing server 102 may receive the De-ID$_1$s from the first computing system 104. In order to assist in the linkage of the De-IDs, the second computing system 108 and processing server 102 may agree on the salts and one-way hashes, or other mechanisms, used to generate the De-ID$_2$s (e.g., and any subsequent De-IDs, as applicable). In some cases, the second computing system 108 may select and use the one-way hashes and salts, which may be forwarded to the processing server 102. The processing server 102 may identify the salts that are used and may independently generate the De-ID$_2$s from the De-ID$_1$s. However, unlike the second computing system 108, the processing server 102 may retain the De-ID$_1$s, and may maintain a correlation between De-ID$_1$s and the De-ID$_2$s (e.g., in a lookup table or other suitable mechanism). In cases where additional rounds of de-identification are performed, the processing server 102 may retain each round of De-IDs, such that a De-ID$_3$ may be matched to the De-ID$_1$ from which it originated.

When the second computing system 108 identifies a De-ID$_2$ (e.g., or De-ID$_3$ or other subsequent value depending on the number of de-identifications performed) of an individual 106 that needs to be contacted, the second computing system 108 may provide that De-ID to the processing server 102. The processing server 102 may receive the De-ID and may identify the De-ID$_1$ from which it originated using the lookup tables or other mechanism used to maintain the correlation. In embodiments where the processing server 102 does not receive PII or a legal basis to contact individuals 106, the processing server 102 may forward the identified De-ID$_1$ to the first computing system 104. The first computing system 104 can then match the De-ID$_1$ to the original unique identifier for the individual 106 and contact the individual accordingly. For instance, in the above example, the first computing system 104 can identify the individual 106 that has the significant health concern and inform them of the health concern. In such an embodiment, the individual 106 may be apprised of their health concern with only the first computing system 104 ever possessing PII; the second computing system 108 may identify that a random individual 106 has a health concern with no knowledge of who the actual individual 106 is, while the processing server 102 may only know that a De-ID$_1$ needs to be provided to the first computing system 104 without any knowledge as to the circumstances or any information about any individual 106.

In embodiments where the processing server 102 may receive PII from the first computing system 104, the processing server 102 may be able to identify the unique identifier or other information used to contact the individual 106 from the received PII using the identified De-ID$_1$. The processing server 102 can then contact the individual 106 accordingly, such as to notify them of the significant health concern in the above example. In such embodiments, the second computing system 108 may still have no knowledge as to the actual individual 106 that has a health concern, while the processing server 102 may know and be able to contact the individual 106 only with the consent of the individuals 106 for which PII is provided to the processing server 102. In some cases, only a subset of the plurality of individuals 106 may provide consent to the processing server 102. In such cases, the processing server 102 may have PII for those individuals 106 and be able to contact them directly, while any De-ID$_1$s for which there is no PII may be forwarded on to the first computing system 104.

The methods and systems discussed herein enable linkage of a de-identified data identifier (e.g., a De-ID$_3$) to traceable data (e.g., a De-ID$_1$) that can be used by an authorized entity to match back to PII to contact an individual 106 in cases where there is a legal basis. In the above example, an individual 106 that has a significant health concern can be contacted in such an instance with their consent, where any PII of the individual 106 may not be provided to any entity involved aside from the first computing system 104. Even in cases where the need to contact the individual 106 arises, the second computing system 108 and processing server 102 may both never obtain any PII of the individual 106 or any other information unless there is a sufficient legal basis to do so, thus maintaining all individual privacy and security. The result is that individuals 106 can be assured of their privacy, while still having the peace of mind that they can be contacted should the need arise even when de-identified information is being used.

Processing Server

Figure 2:
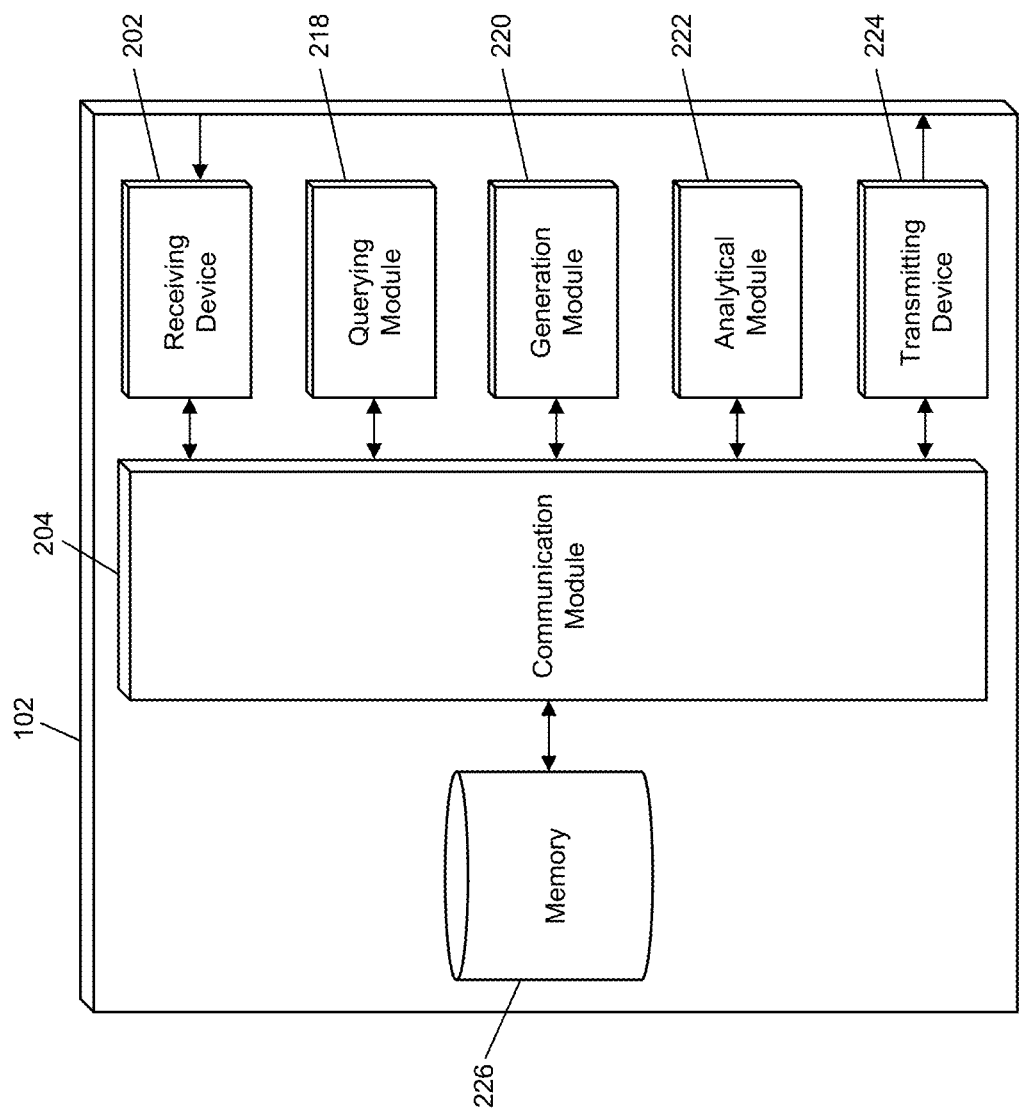
FIG. 2 is a block diagram illustrating the processing server of the system of FIG. 1 for linking de-identified data identifiers to traceable data in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from first computing systems 104, second computing systems 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by first computing systems 104 that are superimposed or otherwise encoded with De-ID$_1$s. In cases where the processing server 102 may be authorized to receive PII, the receiving device 202 may also receive data signals from first computing systems 104 that are superimposed or otherwise encoded with PII that corresponds to the De-ID$_1$s. In some instances, the individual consent for the processing server 102 to receive the PII may be included. The receiving device 202 may also be configured to receive data signals electronically transmitted by second computing systems 108 that are superimposed or otherwise encoded with salts for use in de-identifying identifiers as well as De-ID$_2$s or subsequent De-IDs, for which consent has been given by individuals 106. For instance, in the above example, individuals 106 may consent to the second computing system 108 providing De-ID$_2$s to the processing server 102 of a significant health concern is found.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, analytical module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a querying module 218. The querying module 218 may be configured to execute queries on databases to identify information. The querying module 218 may receive one or more data values or query strings, and may execute a query string based thereon on an indicated database, such as a memory 226 of the processing server 102 to identify information stored therein. The querying module 218 may then output the identified information to an appropriate engine or module of the processing server 102 as necessary. The querying module 218 may, for example, execute a query on the memory 226 to identify a De-ID$_1$ that matches with a De-ID$_2$ or subsequent De-ID.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate De-IDs by applying one-way hashing algorithms and salts to De-IDs. The generation module 220 may also be configured to generate data messages, such as for transmission to first computing systems 104 that include De-ID$_1$s, or for transmission to individuals 106 in cases where the processing server 102 has legal basis to do so.

The processing server 102 may also include an analytical module 222. The analytical module 222 may be configured to perform analysis for the processing server 102 as part of the functions discussed herein. The analytical module 222 may receive instructions as input, may perform analysis as instructed, and may output a result of the performed analysis to another module or engine of the processing server 102. For example, the analytical module 222 may be configured to analyze De-IDs to identify underlying De-IDs, such as through the use of lookup tables, to analyze PII to identify methods of contacting an individual 106 with individual consent, etc.

The processing server 102 may also include a transmitting device 224. The transmitting device 224 may be configured to transmit data over one or more networks via one or more network protocols. In some instances, the transmitting device 224 may be configured to transmit data to first computing systems 104, second computing systems 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to first computing systems 104 that are superimposed or otherwise encoded with De-ID$_1$s for use in contacting individuals 106. In some cases, additional information may accompany a De-ID$_1$, such as information regarding the significant health concern in the above example. In cases where the processing server 102 has received PII from the first computing system 104, the transmitting device 224 may be configured to electronically transmit data signals directly to individuals 106 using a suitable method (e.g., to a computing device possessed by or otherwise associated with an individual 106). The transmitting device 224 may also be configured to electronically transmit data signals to second computing systems 108, which may be superimposed or otherwise encoded with, for instance, requests for salts and other information regarding further de-identification of De-IDs.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, correlations between De-IDs, lookup tables that match De-IDs to subsequent De-IDs, PII with explicit individual consent, communication data for first computing systems 104 and second computing systems 108, hashing algorithms, salts, etc.

Process for Linkage of De-Identified and Traceable Data

Figure 3:
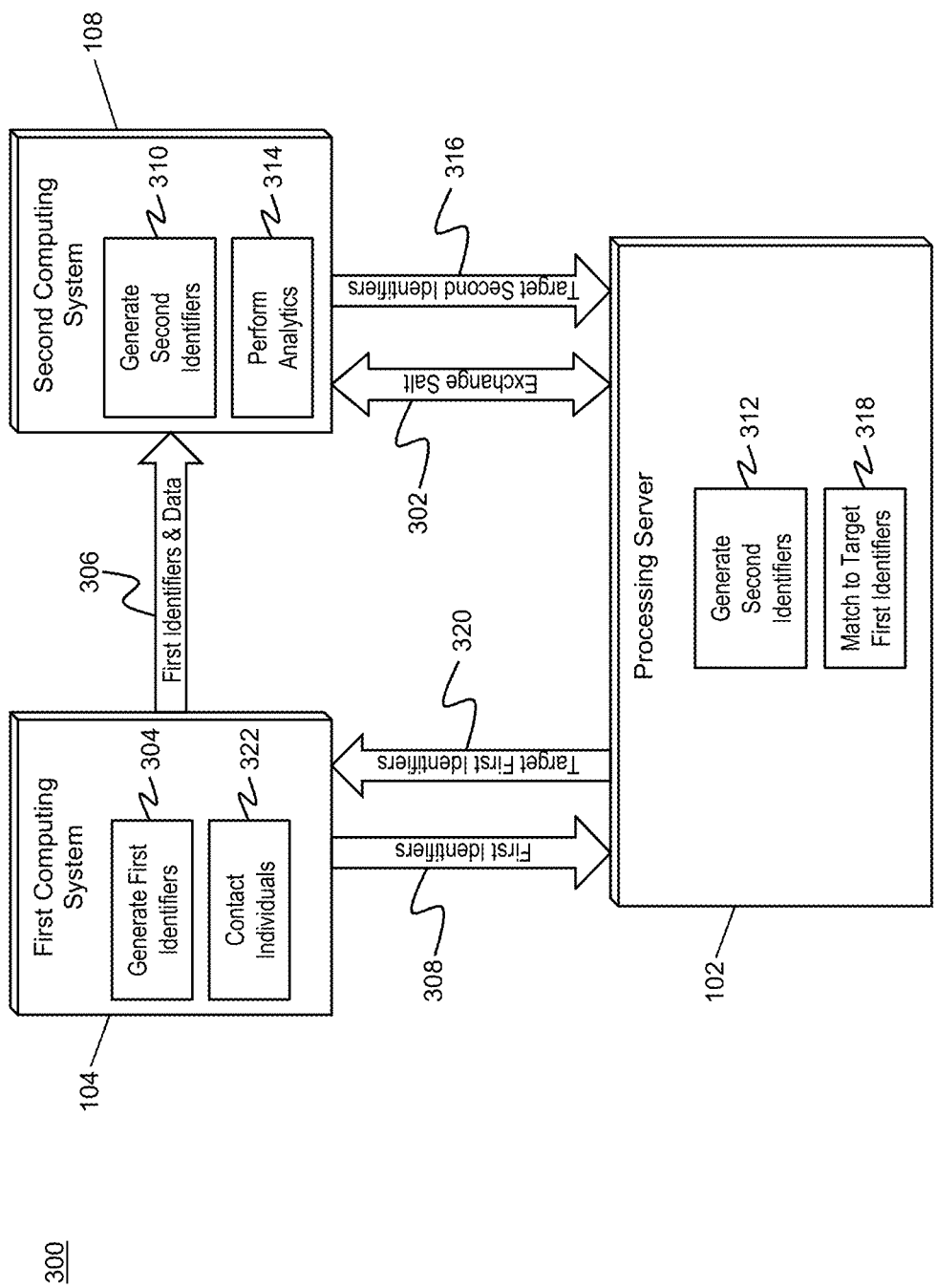
FIG. 3 is a flow diagram illustrating a process for the linking de-identified data identifiers to traceable data in the system of FIG. 1 in accordance with exemplary embodiments.

FIG. 3 illustrates an example process 300 performed in the system 100 for the linkage of an de-identified De-ID to a traceable De-ID for use in contacting an individual 106 in circumstances where there is a legal basis to do so.

In step 302, the processing server 102 and the second computing system 108 may exchange one or more salts that are to be used during de-identification of De-IDs. In step 304, the first computing system 104 may generate De-ID$_1$s for individuals 106 using any suitable mechanism, where the De-ID$_1$s may not be personally identifiable to any of the individuals 106. In step 306, the first computing system 104 may transmit the De-ID$_1$s with the accompanying data, but not including the original unique identifiers or any PII, to the second computing system 108.

In step 308, the first computing system 104 may transmit the De-ID$_1$s with no other data to the processing server 102, for receipt thereby by the receiving device 202 thereof. In step 310, the second computing system 108 may generate De-ID$_2$s from the De-ID$_1$s by applying a one-way hashing algorithm with the previously identified salt thereto. As part of the generation of the De-ID$_2$s, the second computing system 108 may discard the De-ID$_1$s. In step 312, the generation module 220 of the processing server 102 may also generate the De-ID$_2$s from the De-ID$_1$s using the same one-way hashing algorithm and salt. The querying module 218 of the processing server 102 may execute a query on the memory 226 thereof to store the De-$ID_1$s and corresponding De-$ID_2$s therein.

In step 314, the second computing system 108 may perform analytics on the received data. In the above example, the second computing system 108 may perform medical research using the data received from the first computing system 104 that is not personally identifiable, and may identify at least one De-$ID_2$ for which there is a significant health concern. In step 316, the second computing system 108 may transmit the De-$ID_2$s to the processing server 102 in any circumstance where it is warranted, and where, in some cases, consent has been explicitly given to the second computing system 108 to do so for the respective De-$ID_2$s. The receiving device 202 of the processing server 102 may receive the De-$ID_2$s from the second computing system 108, and, in step 318, the querying module 218 of the processing server 102 may execute one or more queries on the memory 226 to identify the De-$ID_1$ that matches with each received De-$ID_2$.

In step 320, the transmitting device 224 of the processing server 102 may electronically transmit a data signal to the first computing system 104 using a suitable communication network and method that is superimposed with the identified De-$ID_1$s. The first computing system 104 may receive the De-$ID_1$s and, in step 322, may identify the unique identifiers and/or other PII associated with each of the received De-$ID_1$s and contact the associated individual 106. In the above example, the first computing system 104 may reach out to notify the identified individuals 106 of the possible health concern as identified by the second computing system 108.

Figure 4:
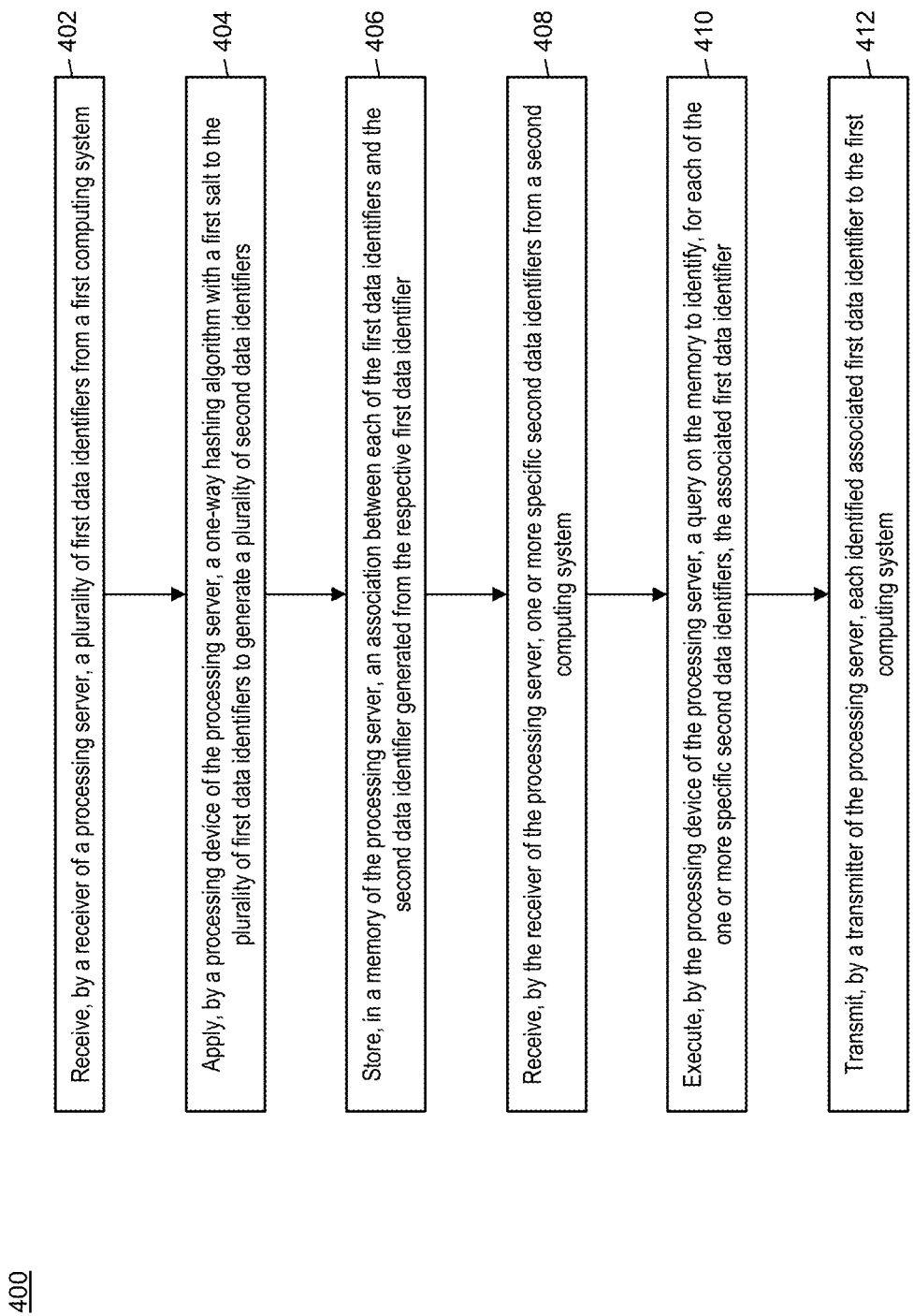
FIG. 4 is a flow chart illustrating an exemplary method for linking de-identified data identifiers to traceable data in accordance with exemplary embodiments.

Exemplary Method for Linking De-Identification Data Identifiers to Traceable Data FIG. 4 illustrates a method 400 for linking identifiers that have been de-identified multiple times to de-identified identifiers that can serve as traceable data that enable an individual to be contacted without an exchange of PII when consent has been provided.

In step 402, a plurality of first data identifiers (e.g., De-$ID_1$s) may be received by a receiver (e.g., the receiving device 202) of a processing server (e.g., the processing server 102) from a first computing system (e.g., the first computing system 104). In step 404, a one-way hashing algorithm with a first salt may be applied to the plurality of first data identifiers by a processing device (e.g., the generation module 220) of the processing server to generate a plurality of second identifiers (e.g., De-$ID_2$s). In step 406, an association between each of the first identifiers and the second data identifier generated from the respective first data identifier may be stored in a memory (e.g., the memory 226) of the processing server.

In step 408, one or more specific data identifiers may be received by the receiver of the processing server from a second computing system (e.g., the second computing system 108). In step 410, a query may be executed on the memory of the processing server by the processing device (e.g., the querying module 218) of the processing server to identify, for each of the one or more specific data identifiers, the associated first data identifier. In step 412, each identified associated first data identifier may be transmitted by a transmitter (e.g., the transmitting device 224) of the processing server to the first computing system.

In some embodiments, step 412 may alternatively include generating, by the processing device of the processing server, a data message for each of the one or more specific second data identifiers based on at least one or more personally identifiable data values received with the identified associated first data identifier and transmission of each generated data message. In some such embodiments, the generated data messages may be transmitted to the first computing system with the identified associated first data identifier. In other such embodiments, each generated data message may be transmitted to a separate computing device identified based on the associated one or more personally identifiable data values.

In one embodiment, the processing server may not receive personally identifiable information from the first computing system or the second computing system, and the first computing system may not receive any of the plurality of second data identifiers. In some embodiments, the first salt may be stored in the memory of the processing server. In one embodiment, the method 400 may further include receiving, by the receiver of the processing server, the first salt from the second computing system prior to application of the one-way hashing algorithm. In some embodiments, each of the one or more specific second data identifiers may be accompanied by a data file indicating express consent provided by an individual associated with the respective specific second data identifier.

Computer System Architecture

Figure 5:
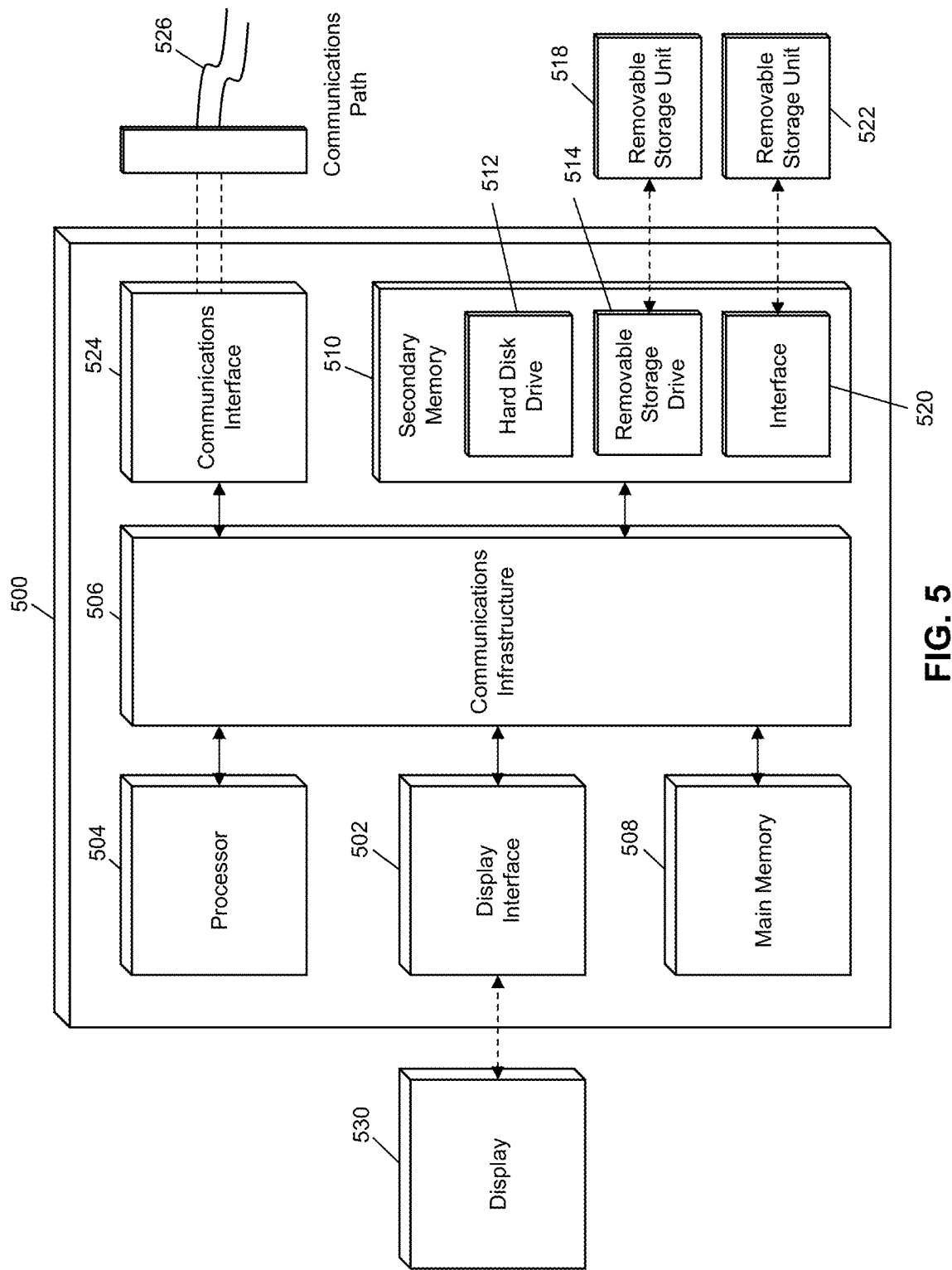
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for propagating survival of cryptographic currency after inactivity over a predetermined period of time in a blockchain through the use of smart contracts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for linking de-identified data identifiers to traceable data identifiers in compliance with applicable data privacy rules and regulations, comprising:
   receiving, by a receiver of a processing server, a plurality of first data identifiers from a first computing system, said processing server does not receive personally identifiable information (PII) from the first computing system;
   applying, by a processing device of the processing server, a one-way hashing algorithm with a first salt to the plurality of first data identifiers to generate a plurality of second data identifiers;
   storing, in a memory of the processing server, an association between each of the first data identifiers and the second data identifier generated from the respective first data identifier;
   receiving, by the receiver of the processing server, one or more specific second data identifiers from a second computing system, said processing server does not receive PII from the second computing system, and said first computing system does not receive any of the one or more specific second data identifiers;
   executing, by the processing device of the processing server, a query on the memory to identify, for each of the one or more specific second data identifiers, the associated first data identifier; and
   transmitting, by a transmitter of the processing server, each identified associated first data identifier to the first computing system.

2. The method of claim 1, wherein the first salt is stored in the memory of the processing server.

3. The method of claim 1, further comprising:
   receiving, by the receiver of the processing server, the first salt from the second computing system prior to application of the one-way hashing algorithm.

4. The method of claim 1, wherein each of the one or more specific second data identifiers is accompanied by a data file indicating express consent provided by an individual associated with the respective specific second data identifier.

5. A method for linking de-identified data identifiers to traceable data identifiers in compliance with applicable data privacy rules and regulations, comprising:
   receiving, by a receiver of a processing server, a plurality of first data identifiers from a first computing system and, for each of the first data identifiers, one or more personally identifiable data values;
   applying, by a processing device of the processing server, a one-way hashing algorithm with a first salt to the plurality of first data identifiers to generate a plurality of second data identifiers;
   storing, in a memory of the processing server, an association between each of the first data identifiers and the second data identifier generated from the respective first data identifier;
   receiving, by the receiver of the processing server, one or more specific second data identifiers from a second computing system, wherein said processing server does not receive PII from the second computing system, and said first computing system does not receive any of the one or more specific second data identifiers;
   executing, by the processing device of the processing server, a query on the memory to identify, for each of the one or more specific second data identifiers, the associated first data identifier;
   generating, by the processing device of the processing server, a data message for each of the one or more specific second data identifiers based on at least the one or more personally identifiable data values received with the identified associated first data identifier; and
   transmitting, by a transmitter of the processing server, each generated data message.

6. The method of claim 5, wherein each generated data message is transmitted to the first computing system with the identified associated first data identifier.

7. The method of claim 5, wherein each generated data message is transmitted to a separate computing device identified based on the associated one or more personally identifiable data values.

8. A system for linking de-identified data identifiers to traceable data identifiers in compliance with applicable data privacy rules and regulations, comprising:
   a transmitter of a processing server;
   a receiver of the processing server configured to receive a plurality of first data identifiers from a first computing system, wherein said processing server does not receive personally identifiable information (PII) from the first computing system;
   a processing device of the processing server configured to apply a one-way hashing algorithm with a first salt to the plurality of first data identifiers to generate a plurality of second data identifiers; and
   a memory of the processing server configured to store an association between each of the first data identifiers and the second data identifier generated from the respective first data identifier, wherein
   the receiver of the processing server is further configured to receive one or more specific second data identifiers from a second computing system, wherein said processing server does not receive PII from the second computing system, and said first computing system does not receive any of the one or more specific second data identifiers;
   the processing device of the processing server is further configured to execute a query on the memory to identify, for each of the one or more specific second data identifiers, the associated first data identifier, and
   the transmitter of the processing server is configured to transmit each identified associated first data identifier to the first computing system.

9. The system of claim 8, wherein the first salt is stored in the memory of the processing server.

10. The system of claim 8, wherein the receiver of the processing server is further configured to receive the first salt from the second computing system prior to application of the one-way hashing algorithm.

11. The system of claim 8, wherein each of the one or more specific second data identifiers is accompanied by a data file indicating express consent provided by an individual associated with the respective specific second data identifier.

12. A system for linking de-identified data identifiers to traceable data identifiers in compliance with applicable data privacy rules and regulations, comprising:

a transmitter of a processing server;
a receiver of the processing server configured to receive a plurality of first data identifiers from a first computing system and, for each of the first data identifiers, one or more personally identifiable data values;
a processing device of the processing server configured to apply a one-way hashing algorithm with a first salt to the plurality of first data identifiers to generate a plurality of second data identifiers; and
a memory of the processing server configured to store an association between each of the first data identifiers and the second data identifier generated from the respective first data identifier, wherein
the receiver of the processing server is further configured to receive one or more specific second data identifiers from a second computing system, said processing server does not receive PII from the second computing system, and said first computing system does not receive any of the one or more specific second data identifiers,
the processing device of the processing server is further configured to
 execute a query on the memory to identify, for each of the one or more specific second data identifiers, the associated first data identifier, and
 generate a data message for each of the one or more specific second data identifiers based on at least the one or more personally identifiable data values received with the identified associated first data identifier, and
the transmitter of the processing server is configured to transmit each generated data message.

13. The system of claim 12, wherein each generated data message is transmitted to the first computing system with the identified associated first data identifier.

14. The system of claim 12, wherein each generated data message is transmitted to a separate computing device identified based on the associated one or more personally identifiable data values.

\* \* \* \* \*